United States Patent
Beck et al.

(10) Patent No.: US 8,080,950 B2
(45) Date of Patent: Dec. 20, 2011

(54) INDUCTION MOTOR TORQUE CONTROL IN A PUMPING SYSTEM

(75) Inventors: Thomas L. Beck, Union Grove, WI (US); Michael D. Dry, Racine, WI (US); Mark E. Garlow, Kenosha, WI (US); Michael O. Lucas, Franksville, WI (US); Michael A. MacDonald, Racine, WI (US); Ronald G. Peterson, Racine, WI (US)

(73) Assignee: Unico, Inc., Franksville, WI (US)

( * ) Notice: Subject to any disclaimer, the term of this patent is extended or adjusted under 35 U.S.C. 154(b) by 0 days.

(21) Appl. No.: 12/724,120

(22) Filed: Mar. 15, 2010

(65) Prior Publication Data

US 2010/0231146 A1 Sep. 16, 2010

Related U.S. Application Data

(60) Provisional application No. 61/160,498, filed on Mar. 16, 2009.

(51) Int. Cl.
*H02P 7/06* (2006.01)

(52) U.S. Cl. ........ 318/143; 318/140; 318/141; 318/157; 318/158; 322/29; 322/32; 290/12; 290/14; 290/15; 290/23

(58) Field of Classification Search .................. 318/143, 318/157, 140; 290/12, 14, 15, 23; 322/29, 322/32
See application file for complete search history.

(56) References Cited

U.S. PATENT DOCUMENTS

| | | | |
|---|---|---|---|
| 3,620,323 A * | 11/1971 | Maeda et al. | 180/65.25 |
| 6,887,184 B2 * | 5/2005 | Buchanan et al. | 477/174 |
| 7,117,120 B2 | 10/2006 | Beck et al. | |
| 7,170,262 B2 | 1/2007 | Pettigrew | |
| 7,178,618 B2 * | 2/2007 | Komeda et al. | 180/65.275 |
| 7,508,147 B2 * | 3/2009 | Rastogi et al. | 318/376 |
| 7,558,699 B2 | 7/2009 | Beck et al. | |
| 2003/0216215 A1 * | 11/2003 | Suzuki et al. | 477/5 |

FOREIGN PATENT DOCUMENTS

| | | |
|---|---|---|
| JP | 11-082316 A | 3/1999 |
| JP | 2004-108296 A | 4/2004 |
| JP | 2004-353624 A | 12/2004 |
| JP | 2007-211781 A | 8/2007 |

* cited by examiner

*Primary Examiner* — Rita Leykin

(74) *Attorney, Agent, or Firm* — Reinhart Boerner Van Deuren P.C.

(57) ABSTRACT

A system and method are provided for controlling the speed of a motor driving a load that is electrically connected to a generator driven by an engine, through use of a first control feedback loop configured to control the rotor flux of the motor by controlling the field excitation of the generator, and a second control feedback loop configured to control the speed of the motor by controlling the throttle position of the engine.

11 Claims, 3 Drawing Sheets

INDUCTION MOTOR TORQUE CONTROL IN A PUMPING SYSTEM

CROSS-REFERENCE TO RELATED PATENT APPLICATIONS

This patent application claims the benefit of U.S. Provisional Patent Application No. 61/160,498, filed Mar. 16, 2009, the disclosure and teachings of which are incorporated herein, in their entireties, by reference.

FIELD OF THE INVENTION

This invention generally relates to controlling the performance of an induction motor and, more particularly, to methods for controlling the performance of an induction motor used in a pumping system.

BACKGROUND OF THE INVENTION

In the oil and gas industry, an engine (e.g., a diesel, gasoline, natural gas, or propane engine) is sometimes used to power a three phase generator. The generator, in turn, supplies power to a three phase induction motor used to drive a mechanical pumping apparatus. If the induction motor in such a system is operated at variable speeds, the capability of the pumping system is greatly expanded. However, prior approaches to providing variable speed operation of the pump in such pumping systems have not been entirely satisfactory. In one previously used approach to operating a pump at variable speed in an engine driven pumping system, variable frequency and voltage power is delivered to a three phase motor driving the pump. Typically, in a system using a generator as the source of electrical power, an electronic variable speed drive (a.k.a., a variable frequency drive or VFD) is interposed between the generator and the induction motor to provide variable voltages and frequencies to the motor. There are many potential disadvantages to using a variable speed drive, including voltage harmonics generated on the motor leads that can damage the motor, current harmonics generated at the input of the VFD that can cause problems for the generator, the complexity in VFD design and/or the need for an expensive output transformer when higher voltages are used (most often when motor leads are very long).

To eliminate the need for a variable speed drive, some prior approaches employ a variable frequency power system that varies the speed and excitation of a three phase generator to produce a desired output frequency and voltage in an attempt to achieve the desired operation of the three phase motor in the pump. U.S. Pat. No. 7,170,262, to Pettigrew discloses a variable speed drive system of this type, and discusses the operation of such a system in comparison to earlier prior systems of the type using a variable speed drive as described herein above.

Unfortunately, variable frequency power systems, of the type exemplified by Pettigrew, have significant drawbacks. For example, simply attempting to control the output of the three phase generator may not produce the desired operation of the pump. The output speed of the induction motor driving the pump will vary based on factors such as pump loading. When that occurs, the user of such a variable frequency power system will not have accurate control of the pump speed and may encounter a variety of undesirable situations. For example, the pump may operate at a lower than expected speed, resulting in lower than optimal production or the pump may operate at a higher than desired speed and experience a "pump dry" or "pump off" condition causing the pump to run without fluid to cool and lubricate it or the pump will turn off to allow the fluid to refill the casing, causing sediment to settle in the pump. These conditions will result in damage to the pump, resulting in reduced life.

The present invention is directed to overcoming the drawbacks described and, in addition, improving the state of the art in the oil and gas industry.

BRIEF SUMMARY OF THE INVENTION

In one embodiment, a system and method for controlling the rotational speed of a motor driving a pump is provided. By controlling the rotational speed of the motor instead of the frequency of the generator, the operation of the pump is more precisely and accurately controlled.

There is provided a system for controlling the speed of a motor driving a load. The motor is electrically connected to a generator which is driven by an engine. The generator includes a controllable field. The system includes a first control feedback loop configured to limit the difference between the magnetic flux in the rotor of the motor and a commanded level of magnetic flux wherein the magnetic flux in the rotor is estimated based on measurement of electrical inputs to the motor cables. A second control feedback loop is configured to limit the difference between the speed of the rotor of the motor and a commanded speed wherein the speed of the motor is estimated based on a measurement of electrical inputs to the motor cables.

There is further provided a method for controlling the speed of a motor driving a load. The motor is electrically connected to a generator which is driven by an engine. The generator includes a controllable field and the engine has a throttle. The method includes periodically performing the steps of measuring voltage and current inputs to the motor cables. Based on the measurements of voltage and current inputs to the motor cables, a signal is generated representing an estimate of rotor flux of the motor. The estimate of the rotor flux of the motor is compared to a flux rotor command signal are used to generate a signal representing the rotor flux error. The method further includes generating a flux excitation command signal based on the signal representing the rotor flux error with the flux excitation command signal controlling the excitation of the field of the generator. A signal representing an estimate of the speed of the motor based on the measurements of the voltage and current inputs to the motor is generated. A comparison of the speed command signal with the signal representing an estimate of the speed of the motor is used to generate a signal representing the motor speed error. A throttle position command signal is generated based on the signal representing the motor speed error. A throttle position command signal is generated based on the signal representing the motor speed error with the throttle position command signal controlling the position of the throttle of the engine.

There is further provided a pump control system to control mechanical inputs to a pump. The pump is coupled to a electric motor and the electric motor is coupled to a generated driven by an engine. The pump control system includes and error control unit having a plurality of interface devices. A motor vector model is coupled to at least two of the interface devices. A rotor flux summation device is configured to provide a flux error estimate coupled to the motor vector model and one of the interface devices. A motor speed summation device coupled to the motor vector model and a motor speed error control is coupled to the motor speed summation device and one of the interface devices. The pump control system further includes a supervisory controller coupled to the motor speed summation device, the motor vector model, and the rotor flux summation device, wherein the speed of the motor coupled to the pump is controlled by a first control feedback loop configured to provide an excitation current command to the generator and a second control feedback loop configured to provide a throttle position command to the engine. In another embodiment, the pump control system includes an engine torque linearizer which is configured to linearize an engine torque command. The linearizer is coupled to at least one of the interface devices, the motor speed control and the motor vector model, wherein the system gain of the throttle position is near constant. During system start up, the supervisory control is configured to set a level of magnetic flux to reduce loading on the engine. In one embodiment, the supervisory controller sets the magnetic flux at zero during the system start up.

Other embodiments of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
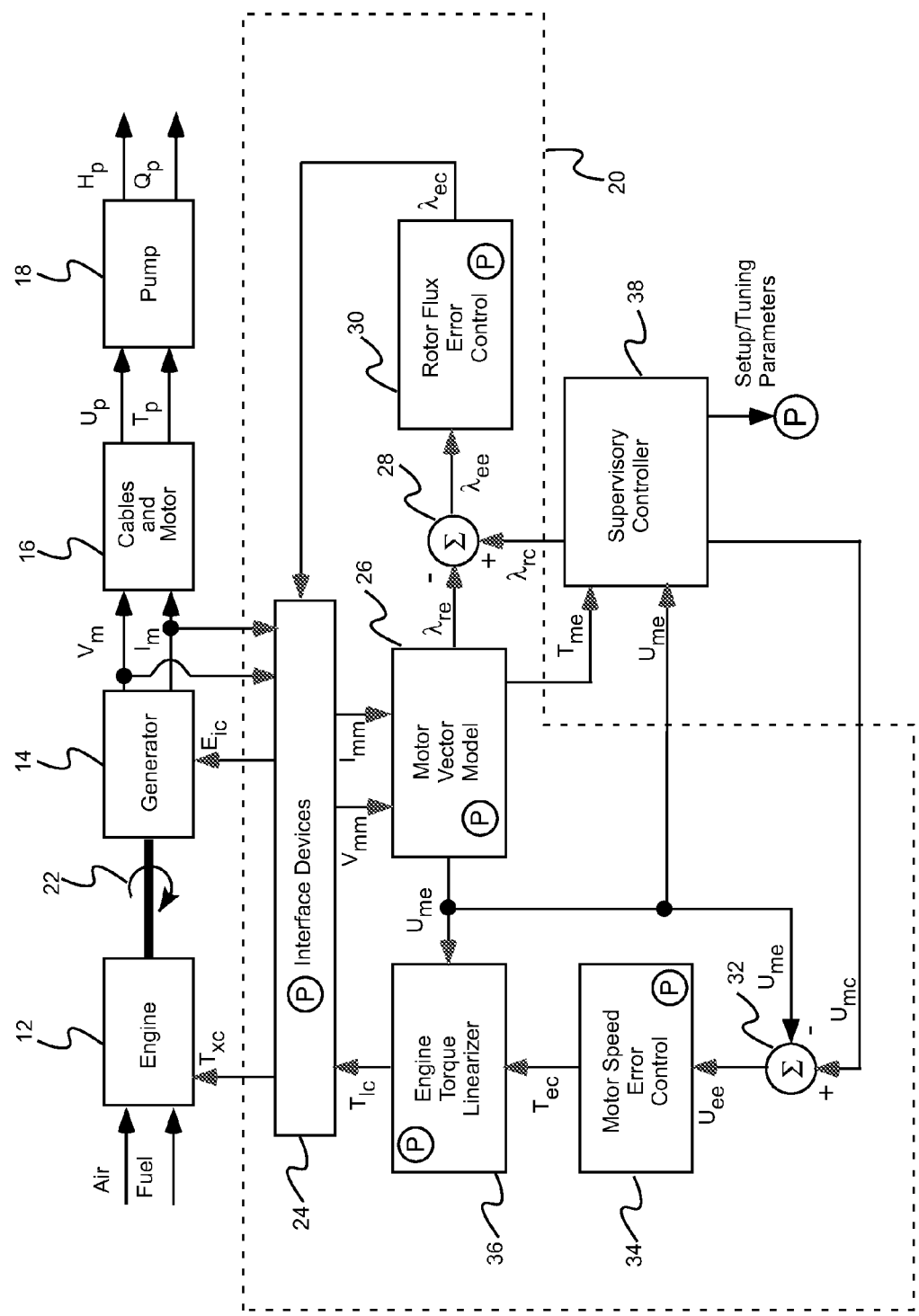
FIG. 1 is an exemplary embodiment of an induction motor control system having an error control unit in accordance with the teachings of the present invention.

Referring now to FIG. 1, a pump control system 10 is illustrated. As will be more fully explained below, the error control system 20 of the pump control system 10 monitors one or more characteristics of the electrical input to the cables and motor 16 and, based on what is observed, calculates the mechanical inputs to the pump 18 and adjusts the operation of the engine 12 and generator 14. By controlling the mechanical inputs to the pump 18, the operation of the pump is more precise, accurate and dependable than would be provided by a system which only controls electrical outputs of a generator.

The engine 12 intake ingests air and fuel and, by combusting the mixture thereof, generates a rotary mechanical engine output 22. The rotary mechanical engine output 22 is dependent on the throttle position $T_{xc}$, fuel used, air temperature and density, etc. The engine 12 may operate using diesel, gasoline, liquid propane, natural gas or other types of fuels. The engine 12 is operably coupled to, and drives, the generator 14. In that regard, the rotary mechanical engine output 22 is typically directly coupled to the mechanical input of the generator 14. Even so, other types of connections such as gear boxes, belts, hydraulic power coupling and the like may be employed depending on the particular application. The generator 14 is a synchronous three phase generator, having a field which can be controlled.

The generator 14 is electrically coupled by electrical cables to a motor, which are collectively represented at 16. In the system shown, the pump is a centrifugal pump of the type known as an electrical submersible pump (ESP), so both the motor 16 and the pump 18 are disposed within a well casing far below ground level and the cables 16 are of considerable length. In a typical oil well, for example, the cables 16 may be thousands of feet long. Through the cables 16, the generator 14 supplies the motor 16 with electrical power. In the illustrated embodiment of FIG. 1, the motor 16 is a three phase induction motor. The electrical inputs to the motor 16 can be characterized by the voltages ($V_m$) and currents ($I_m$). The motor 16 generates a rotary mechanical output that may be characterized by pump speed ($U_p$) and pump torque ($T_p$).

The motor 16 is mechanically coupled to, and drives, the pump 18, which is situated at or near the bottom of the well casing and immersed or partially immersed in the fluid (e.g., oil and/or water) being pumped. The pump 18 generates a fluid output that may be characterized by, among other parameters, pump head ($H_p$) and pump flow ($Q_p$).

The error control unit 20 is, in general, in electrical communication with the engine 12 and the generator 14. The error control unit 20 is also configured to monitor the voltage inputs ($V_m$) and current inputs ($I_m$) to the cables and motor 16. The error control unit 20 includes interface devices 24, a motor vector model 26, a rotor flux summation device 28, a rotor flux error control 30, a motor speed summation device 32, and a motor speed error control 34. The error control unit 20 also optionally includes an engine torque linearizer 36.

The interface devices 24 are generally employed to manipulate or convert the signals and data sent or received by the error control unit 20. In that regard, the interface devices 24 can include numerous electrical components such as, for example, parallel input/output devices, analog to digital (A/D) converters, digital to analog (D/A) converters, current and voltage sensors, flux estimators, filters, integrators and the like.

In the embodiment shown, the interface devices 24 have two outputs. The first output is the throttle position command ($T_{xc}$), which is converted from the torque error command ($T_{ec}$) of the motor speed error control 34 or, in systems where the engine torque linearizer 36 is used, the linearized torque command output ($T_{lc}$) of the engine torque linearizer 36. The second output is the excitation current command ($E_{ic}$) which is converted from the flux error command ($\lambda_{ec}$) generated by the rotor flux error control 30.

For inputs, the interface devices 24 generate three motor voltage measurement signals ($V_{mm}$) to represent the voltages ($V_m$) on each phase of the cables and motor 16 and two motor current measurement signals ($I_{mm}$) to represent the currents ($I_m$) on two of the three phases. The current of the third phase is easily calculated, since the currents of the three phases must total zero, but could be measured as well.

The motor vector model 26 is in electrical communication with the interface devices 24, the rotor flux summation device 28, the supervisory controller 38, the motor speed summation device 32, and, when employed, the engine torque linearizer 36. The motor vector model 26 performs several mathematical functions using the motor voltage measurement signals ($V_{mm}$) and the motor current measurement signals ($I_{mm}$) in order to provide estimations as described in U.S. Pat. No. 7,117,120 to Beck et al. (the '120 patent), which is included herein by reference. For example, the motor vector model 26 calculates and outputs estimates of the performance of the induction motor 16 including the motor speed at the motor shaft ($U_{me}$), the magnetic flux of the rotor ($\lambda_{re}$), and the mechanical torque of the motor shaft ($T_{me}$).

The rotor flux summation device 28 depicted in FIG. 1 receives two inputs, namely the rotor flux estimate ($\lambda_{re}$) from the motor vector model 26 and the rotor flux command ($\lambda_{rc}$) from the supervisory controller 38. During regular operation, the rotor flux command (80 $_{rc}$) is generally kept at a constant value to maintain proper torque ($T_p$) of the motor. However, during starting of the engine 12, the rotor flux command ($\lambda_{rc}$) may be greatly reduced or even held at zero to reduce the loading on the engine 12. Based on the inputs received, the rotor flux summation device 28 generates an output, namely the flux error estimate ($\lambda_{ee}$).

The flux error estimate ($\lambda_{ee}$) is received by the rotor flux error control 30. In general, the rotor flux error control 30 is a control loop structure designed to adjust its output to force the error term to zero. In the illustrated embodiment of FIG. 1, the rotor flux error control 30 is a proportional-integral-derivative (PID) controller. However, other types of control structures, such as proportional-integral (PI), fuzzy logic controllers, and the like, could be used as is known in the art. The rotor flux error control 30 outputs the flux excitation command ($\lambda_{ec}$) to the interface devices 24.

The motor speed summation device 32 illustrated in FIG. 1 receives two inputs, namely the motor speed estimate ($U_{me}$) from the motor vector model 26 and the motor speed command ($U_{mc}$) from the supervisory controller 38. Based on the inputs received, the motor speed summation device 32 generates an output, namely the speed error estimate ($U_{ee}$).

The speed error estimate ($U_{ee}$) is received by the motor speed error control 34. In general, the motor speed error control 34 is a control loop structure designed to adjust its output to force the error term to zero. In the illustrated embodiment of FIG. 1, the motor speed error control 34 is a proportional-integral-derivative (PID) controller. However, other types of control structures, such as proportional-integral (PI), fuzzy logic controllers, and the like, could be used as is known in the art. As shown in FIG. 1, the motor speed error control 34 generates and sends the torque engine command ($T_{ec}$) to the optional engine torque linearizer 36. If the engine torque linearizer 36 is omitted from the error control unit 20, the torque engine command ($T_{ec}$) is provided directly to the interface devices 24.

When used, the engine torque linearizer 36 is used to ensure that a particular input is correlated with the appropriate and desired corrective action. For example, when a three percent (3%) change in engine torque is needed, a throttle change of ten percent (10%) may be required. In such circumstances, the engine torque linearizer 36 manipulates the engine torque command ($T_{ec}$) received from the motor speed error control 34 such that a linearized torque command ($T_{lc}$) is produced. Linearizing the torque command ensures that the system gain of the throttle position control is near constant and, therefore, easier to tune for optimum response. The linearized torque command ($T_{lc}$) is output to the interface devices 24 and provided to the engine 12. As such, the throttle position is changed as needed to correctly correspond to the engine torque command ($T_{ec}$). As shown in FIG. 1, the engine torque linearizer 36 receives two inputs, namely the engine torque command ($T_{ec}$) from the motor speed error control 34 and the motor speed estimate ($U_{me}$) from the motor vector model 26.

Still referring to FIG. 1, most of the components of the error control unit 20 are in electrical communication with the supervisory controller 38. In particular, the supervisory controller 38 delivers the motor speed command ($U_{mc}$) to the motor speed summation device 32 and the rotor flux command ($\lambda_{rc}$) to the flux rotor summation device 28. The values of these two commands may be derived by manual operator input, derived according to the methods described in the '120 patent, or derived by other automatic means. The supervisory controller 38 receives signals representing estimates of the motor speed at the motor shaft ($U_{me}$) and the mechanical torque of the motor shaft ($T_{me}$). The supervisory controller 38 also sets the programmable operating parameters (designated by the letter 'P' in a circle) for the interface devices 24, motor vector model 26, rotor flux error control 30, motor speed error control 34 and, when used, the engine torque linearizer 36. The programmable operating parameters include gains, filter coefficients, lookup table values, motor parameters and the like. The supervisory controller 38 may also receive a variety of other inputs from the error control unit 20 and the system 10 and generate a variety of other outputs to the system 10.

In operation, the engine 12 within the system 10 is started while maintaining the rotor flux command ($\lambda_{rc}$) at or near zero. Some flux command is generally necessary to produce enough motor voltage ($I_m$) for the motor vector model 26 to be able to estimate motor speed ($U_{me}$). The stator speed of the motor 16 is determined by the motor vector module 26 using motor voltage measurement signals ($V_{mm}$) and ($I_{mm}$) representing, respectively, the voltages ($V_m$) and currents ($I_m$) of the phases of the cables and motor 16. Initially, the supervisory controller 38 also limits the calculated value of the slip of the motor 16 to zero (0) so that the calculated estimate of the motor speed ($U_{me}$) is the same as the electrical rotational speed of the stator of the motor 16 and, therefore, also proportional to the rotational speed of the engine 12.

The motor vector model 26 provides the motor speed estimate ($U_{me}$) to the supervisory controller 38. Once the motor speed estimate ($U_{me}$) reaches a predetermined or desired level, the controller ramps up the rotor flux command ($\lambda_{rc}$) at a desired rate. In determining the predetermined or desired level, the controller 38 may access and utilize a fixed parameter or one or more available look up tables. When a look up table is employed, the supervisory controller 38 uses the motor speed estimate ($U_{me}$) to locate the appropriate and corresponding flux rotor command ($\lambda_{rc}$) on the look up table. At this time, the supervisory controller 38 also increases, at a controlled rate, the limit on the calculated value of the slip of the motor 16 so that the calculated estimate of the motor speed ($U_{me}$) becomes the actual rotational speed of the motor 16 and pump 18.

The rotor flux summation device 28 compares the flux rotor command ($\lambda_{rc}$) with the flux rotor estimate ($\lambda_{re}$) provided by the motor vector model 26. Based on that comparison, the rotor flux summation device 28 generates the flux error estimate ($\lambda_{ee}$). The flux error estimate ($\lambda_{ee}$) is used by the rotor flux error control 30 where the flux excitation command ($\lambda_{ec}$) is determined. The flux excitation command ($\lambda_{ec}$) then passes through the interface devices 24 and is received by the generator 14 in the form of the excitation current command ($E_{ic}$). The excitation current command ($E_{ic}$) is received by and determines the field current of the generator 14 and changes the voltages ($V_m$) and currents ($I_m$) of the phases of the cables and motor 16. The process described above repeats at a predetermined frequency. As such, a first control feedback loop is operated.

At all times during operation, the motor speed summation device 32 compares the speed motor command ($U_{mc}$) with the speed motor estimate ($U_{me}$) received from the motor vector model 26 and generates the speed error estimate ($U_{ee}$).

Next, the speed error estimate ($U_{ee}$) is used by the motor speed error control 34 to generate the torque engine command ($T_{ec}$). The torque engine command ($T_{ec}$) is linearized by the engine torque linearizer 36 (when linearization is used) to generate the torque linearized command ($T_{lc}$). The torque linearized command ($T_{lc}$) is transformed through the interface devices 24 and the throttle position command ($T_{xc}$) is produced and delivered to the engine 12. The process described above repeats at a predetermined frequency. As such, a second control feedback loop is operated.

The motor 16 driving the pump 18 operates based on the throttle position command ($T_{xc}$) and the excitation current command ($E_{ic}$). Therefore, the pump speed ($U_p$) and the pump torque ($T_p$) are accurately controlled and the pump head ($H_p$) and the pump flow ($Q_p$) precisely manipulated or held steady as needed for a particular application by the use of the first and second control feedback loops.

Those having skill in the art will appreciate that the invention thus overcomes the disadvantage experienced in prior approaches, such as Pettigrew, to providing variable pump speed control by removing or substantially reducing the possibility that the control of a generator will not translate into the desired operation of the motor and the pump. Indeed, the exemplary embodiment of the system 10 of FIG. 1, according to the invention, relies on controlling the torque of the motor instead of the often faulty assumption that the desired frequency output of the generator will result in the desired operation of the motor and the pump as in prior systems.

As an added advantage, the present invention, through precise control and ramping up of rotor flux, reduces the peak starting current drawn by the motor and, correspondingly, the current that needs to be provided by the generator. In prior systems where a generator is operated at a frequency and voltage and then the motor is switched on "across the line," motor current will peak at a value as much as one thousand percent (1000%) of the operating current of the motor. To handle such large starting currents, prior systems using this approach required many components in the system to be much larger and more robust than they would otherwise have needed to be. The present invention reduces the peak current to less than one hundred fifty percent (150%) of the motor's normal operating current, thereby substantially reducing the weight, complexity and cost of components required for practicing the invention.

Figure 2:
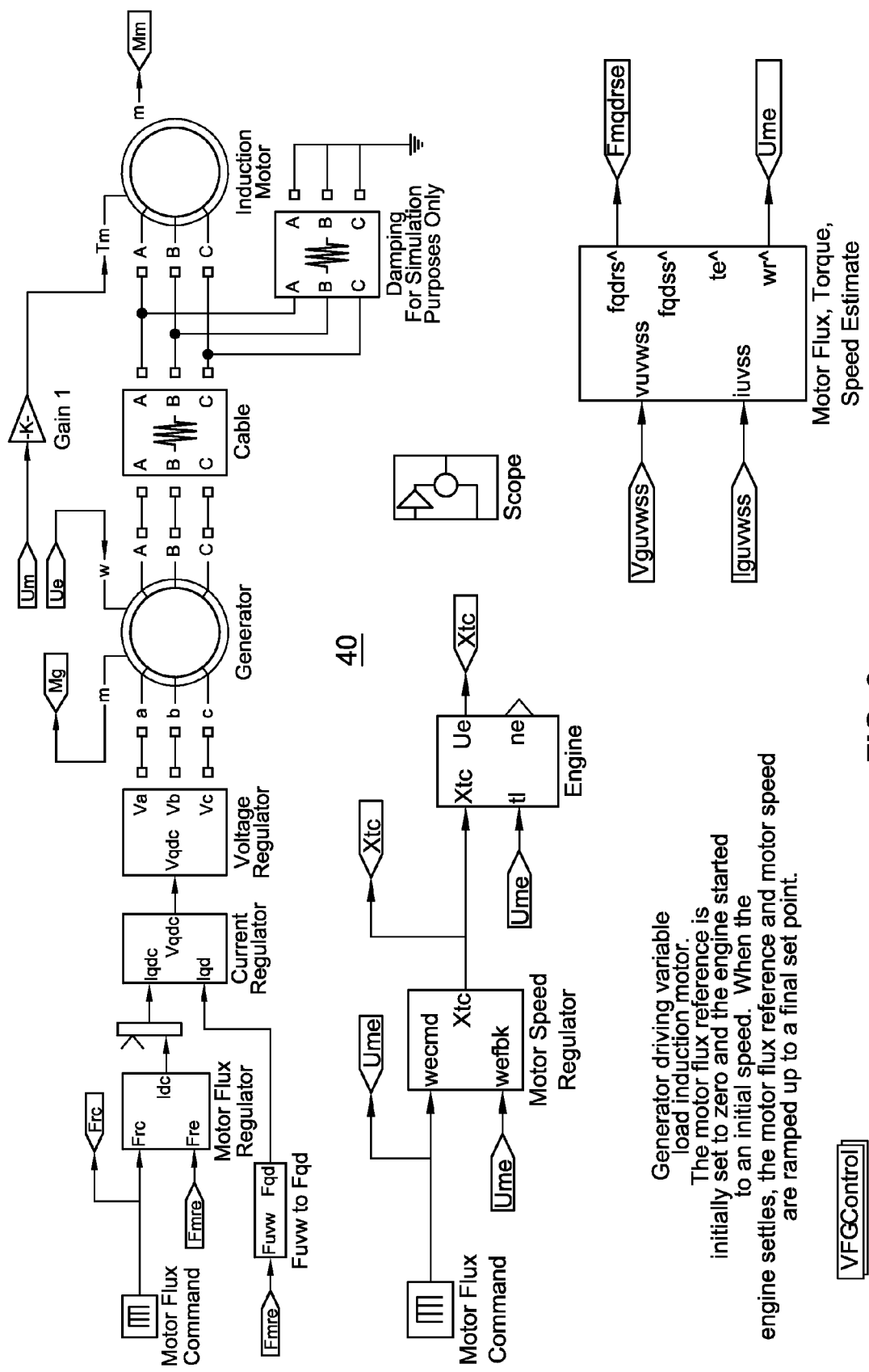
FIG. 2 is a block diagram of a Simulink software simulation performed on a system similar to the system of FIG. 1.

In order to test and evaluate the system 10 (or a near equivalent thereof), a computer simulation was performed using the Simulink program developed by MathWorks. The set up and architecture of the simulation is schematically depicted in the block diagram 40 of FIG. 2.

Figure 3A:
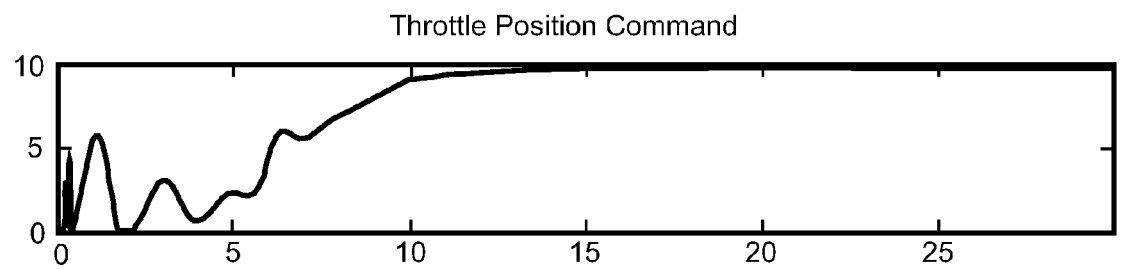
FIG. 3A-3D are graphical depictions of the results from the simulation performed on the system of FIG. 2.
Figure 3B:
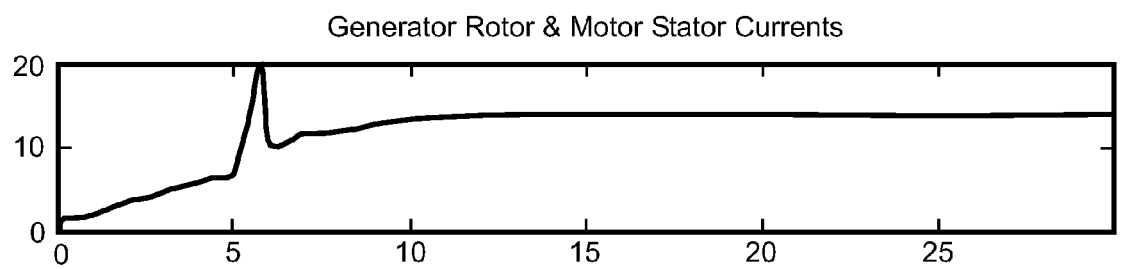
Figure 3C:
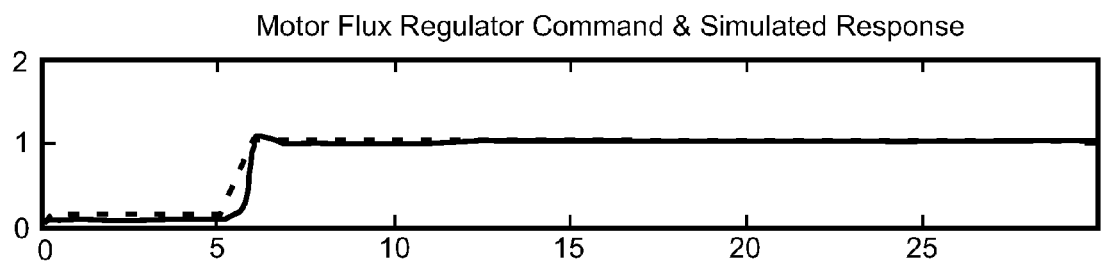
Figure 3D:
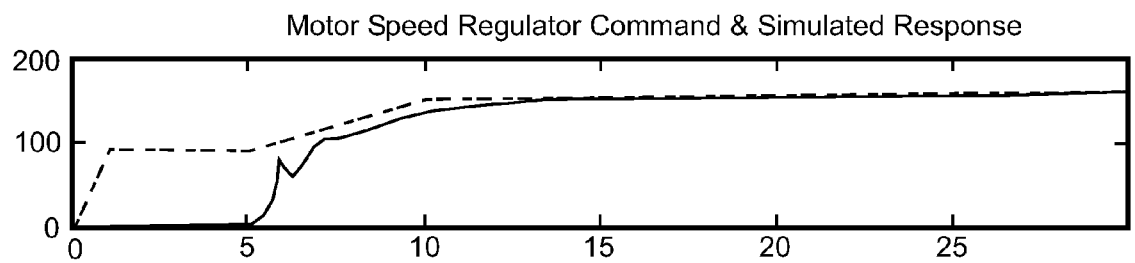

The engine modeled in the simulation was a four cylinder engine from the Simulink demonstration parts. In addition, the motor speed error control 34 and the rotor flux error control 30 were proportional-integral (PI) controllers in the simulation. The simulation yielded the results depicted in FIGS. 3A to 3D. As can be seen in FIG. 3B, the peak current in the generator rotor and motor stator during starting was approximately 20 amperes, while the steady state peak currents were approximately 14 amperes. In FIG. 3C the rotor flux of the motor (solid line) is seen to converge smoothly on the rotor flux command (dashed line). Further, in FIG. 3D, the motor speed (solid line) converged on and maintained at the commanded speed (dashed line).

All references, including publications, patent applications, and patents cited herein are hereby incorporated by reference to the same extent as if each reference were individually and specifically indicated to be incorporated by reference and were set forth in its entirety herein.

For purposes of this disclosure, the term "coupled" means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or the two components and any additional member being attached to one another. Such adjoining may be permanent in nature or alternatively be removable or releasable in nature.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. The term signal is to be construed as including all means of communicating data and/or information including, but not limited to data structures communicated between modules and subroutines in one or more computer programs, serial and parallel data transmission and analog signals. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for controlling the speed of a motor driving a load, wherein the motor is electrically connected to a generator which is driven by an engine, said generator having a controllable field, said system comprising:
    a first control feedback loop configured to limit the difference between the magnetic flux in the rotor of the motor and a commanded level of magnetic flux wherein the magnetic flux in the rotor is estimated based on measurement of electrical inputs to the motor cables; and
    a second control feedback loop configured to limit the difference between the speed of the rotor of the motor and a commanded speed wherein the speed of the motor is estimated based on measurement of electrical inputs to the motor cables;
    the first and second control feedback loops being configured and operatively connected for:
        measuring voltage and current inputs to the motor cables;

generating a signal representing an estimate of the rotor flux of the motor based on the measurements of the voltage and current inputs to the motor cables;

comparing a flux rotor command signal with the signal representing an estimate of the rotor flux of the motor to generate a signal representing the rotor flux error;

generating a flux excitation command signal based on the signal representing the rotor flux error, the flux excitation command signal controlling the excitation of the field of the generator;

generating a signal representing an estimate of the speed of the motor based on the measurements of the voltage and current inputs to the motor;

comparing a speed command signal with the signal representing an estimate of the speed of the motor to generate a signal representing the motor speed error;

generating a throttle position command signal based on the signal representing the motor speed error the throttle position command signal controlling the position of the throttle of the engine;

generating a torque engine command; and linearizing the torque engine command, wherein the gain of the throttle position control is near constant and easier to tune for optimum response.

2. A method for controlling the speed of a motor driving a load, wherein the motor is electrically connected to a generator which is driven by an engine, said generator having a controllable field and said engine having a throttle, comprising periodically performing the steps of:

measuring voltage and current inputs to the motor cables;

generating a signal representing an estimate of the rotor flux of the motor based on the measurements of the voltage and current inputs to the motor cables;

comparing a flux rotor command signal with the signal representing an estimate of the rotor flux of the motor to generate a signal representing the rotor flux error;

generating a flux excitation command signal based on the signal representing the rotor flux error, the flux excitation command signal controlling the excitation of the field of the generator;

generating a signal representing an estimate of the speed of the motor based on the measurements of the voltage and current inputs to the motor;

comparing a speed command signal with the signal representing an estimate of the speed of the motor to generate a signal representing the motor speed error;

generating a throttle position command signal based on the signal representing the motor speed error, the throttle position command signal controlling the position of the throttle of the engine;

generating a torque engine command; and linearizing the torque engine command, wherein the gain of the throttle position control is near constant and easier to tune for optimum response.

3. The method of claim 2, wherein, the motor delivers torque and the method further comprises, holding the flux excitation command signal substantially constant during regular operation of the system, to thereby maintain a substantially constant torque from the motor.

4. The method of claim 2, wherein, the motor delivers torque and the method further comprises, reducing the flux excitation command signal during start-up of the system, to thereby reduce loading on the engine.

5. The method of claim 4, further comprising, reducing the flux excitation command signal during start-up of the system to substantially zero.

6. A pump control system to control mechanical inputs to a pump, the pump coupled to an electric motor, the electric motor coupled to a generator driven by an engine, the pump control system comprising:

an error control unit including:
a plurality of interface devices;
a motor vector model coupled to at least two of the interface devices;
a rotor flux summation device configured to provide a flux error estimate coupled to the motor vector model and one of the interface devices;
a motor speed summation device coupled to the motor vector model; and
a motor speed error control coupled to the motor speed summation device and one of the interface devices; and a supervisory controller coupled to the motor speed summation device, the motor vector model, and the rotor flux summation device, wherein the speed of the motor coupled to the pump is controlled by a first control feedback loop configured to provide an excitation current command to the generator and a second control feedback loop configured to provide a throttle position command to the engine.

7. The pump control system of claim 6, further comprising an engine torque linearizer configured to linearize an engine torque command, the linearizer is coupled to at least one of the interface devices, the motor speed control and the motor vector model, wherein the system gain of the throttle position control is near constant.

8. The pump control system of claim 7, wherein the engine torque linearizer is configured to be selectively programmed by the supervisory controller.

9. The pump control system of claim 6, wherein during system startup the supervisory controller is configured to set a level of magnetic flux to reduce loading on the engine.

10. The pump control system of claim 9, wherein the magnetic flux is set at zero during system startup.

11. The pump control system of claim 6, further comprising the supervisory controller configured to program operating parameters for the interface devices, the motor vector model, the rotor flux error control, and the motor speed error control.

* * * * *